United States Patent [19]
Yoneyama

[11] Patent Number: 5,535,037
[45] Date of Patent: Jul. 9, 1996

[54] OPTICAL REPEATER

[75] Inventor: Kenichi Yoneyama, Tokyo, Japan

[73] Assignee: NEC Corporation, Tokyo, Japan

[21] Appl. No.: 350,054

[22] Filed: Nov. 29, 1994

[30] Foreign Application Priority Data

Dec. 1, 1993  [JP]  Japan ..................... 5-329692

[51] Int. Cl.$^6$ ............................ H04B 10/02; H04B 10/16
[52] U.S. Cl. ........................... 359/177; 359/179; 359/110
[58] Field of Search .................... 359/110, 134, 359/160, 166, 174, 177, 179, 341; 372/6

[56] References Cited

U.S. PATENT DOCUMENTS

| | | | |
|---|---|---|---|
| 5,162,936 | 11/1992 | Taga et al. ............................. | 359/177 |
| 5,299,048 | 3/1994 | Suyama ................................ | 359/134 |
| 5,383,046 | 1/1995 | Tomofuji et al. ..................... | 359/110 |

FOREIGN PATENT DOCUMENTS 3-280732  12/1991  Japan.

*Primary Examiner*—Leo Boudreau
*Assistant Examiner*—Kinfe-Michael Negash
*Attorney, Agent, or Firm*—Sughrue, Mion, Zinn, Macpeak & Seas

[57] ABSTRACT

From a terminal station, a monitoring information is transmitted superimposing on a primary signal. An optical repeater transmits a residual light of an excited light by exciting an erbium doped optical fiber by an exciting light source, in a direction opposite to said primary signal. Therefore, in the optical repeater, when a monitoring information is detected, a response signal to a terminal station is generated. The response signal is transmitted to upstream side by optical modulation of the exciting light source by the response signal.

6 Claims, 2 Drawing Sheets

OPTICAL REPEATER

BACKGROUND OF THE INVENTION

FIELD OF THE INVENTION

The present invention relates generally to an optical repeater. More specifically, the invention relates to a monitoring system for an optical repeater having an optical fiber amplifier.

DESCRIPTION OF THE RELATED ART

As an optical repeater monitoring system for a transit system employing an optical repeater with an optical fiber amplifier, there is a method for determining a fault point by looping back an optical signal on a same line, as disclosed in Japanese Unexamined Patent Publication (Kokai) No. Heisei 3-280732.

FIG. 2 is a block diagram showing the foregoing conventional optical repeater monitoring system. In normal communication, a signal input to an optical repeater 100 is amplified by an optical fiber amplifier 200 and then output. The optical fiber amplifier 200 performs an amplifying function using an exciting light source 110, an optical composer 130, and an erbium doped fiber 120.

After amplification, the signal is branched into two by a first optical branching filter 300. A first output branched by the first optical branching filter 300 is input to a second branching filter 400. A second output branched by the first branching filter 300 is input to a second branching filter 400. A second output branched by the first branching filter 300 is input to an isolator 500.

The isolator 500 is connected in a manner such that a light from an optical shutter 600 may pass to the first branching filter 300. Therefore, even when the branched second output of the first optical branching filter 300 is input to the isolator 500, output to the optical shutter 600 is blocked.

On the other hand, the signal input to the second optical branching filter 400 is further divided into two. A branched first output of the second optical branching filter 400 is input to a third optical branching filter 700. On the other hand, a branched second output of the second optical branching filter 400 is output from the optical repeater 100.

The signal output to the third optical branching filter 700 is branched into two. A branched first output of the third optical branching filter 700 is input to a light detector 800. The light detector 800 converts the input optical signal into an electric signal which is supplied to an optical shutter control circuit 900.

On the other hand, a branched second output of the third optical branching filter 700 is supplied to the optical shutter 600. However, since the optical shutter 600 is normally closed, this signal is stopped at the optical shutter 600.

When a command signal for opening the optical shutter 600 is input to the optical repeater 100, the command signal is input to the optical shutter control circuit 900 via the path set forth above. Then, the control signal is output from the optical shutter control circuit 900 and input to the optical shutter 600 for opening the latter. The command signal for opening the optical shutter 600 will hereafter be referred to as the shutter opening command signal.

Under the condition where the optical shutter 600 is held open, a signal transmitted from a terminal station is input to an optical repeater 100, passes the optical fiber amplifier 200, the first optical branching filter 300, the second optical branching filter 400, the third optical branching filter 700, the optical shutter 600, the isolator 500, the first optical branching filter 300, and the optical fiber amplifier 200 to return to the terminal station.

To resume the normal communication state from the returning state, a command signal for closing the optical shutter 600 is input, hereinafter referred to as the shutter closing command signal. The shutter closing command signal is fed to the optical shutter control circuit 900 via the path set forth above. A signal for closing the optical shutter 600 is fed from the optical shutter control circuit 900 to the optical shutter 600 to thereby close the optical shutter 600.

Thus, repeating the signal returning operation in order from the closest optical repeater to the next optical repeater, the faut point can be determined.

In the prior art illustrated in FIG. 2, the optical fiber amplifier 200 is bidirectional, and thus an optical isolator cannot be inserted at both its input and output. As a result, the optical fiber amplifier 200 tends to cause oscillation. Also, since the characteristics of the optical fiber amplifier vary between the norma communication state and the returning state, the transmission condition varies.

SUMMARY OF THE INVENTION

Therefore, it is an object of the present invention to provide an optical repeater which permits monitoring of a transit system under stable operating conditions by employing a unidirectional optical fiber amplifier.

According to the present invention, an optical repeater for amplifying and repeating an optical signal, on which monitoring information is superimposed, from an optical signal source, comprises:

an input terminal supplied the optical signal from an upstream side;

optical fiber amplifier means for amplifying the optical output signal by optical excitation;

an output terminal;

an unidirectional element transferring the output of the optical fiber amplifier means exclusively to the output terminal;

monitoring information extracting means for extracting the monitoring information superimposed on the optical output signal of the unidirectional elements; and modulating means for modulating, responsive to extraction of the monitoring information by the monitoring information extracting means, for generating a response signal and modulating the exciting light of the optical fiber amplifier with the response signal, a residual light of the exciting light being transmitted in opposite direction to the optical signal from the input terminal via the optical fiber amplifier means.

BRIEF DESCRIPTION OF THE DRAWINGS

The present invention will be understood more fully from the detailed description given herebelow and from the accompanying drawings.

In the drawings.

DESCRIPTION OF THE PREFERRED EMBODIMENT

The preferred embodiment of an optical repeater according to the present invention will be discussed in detail with reference to FIG. 1.

Figure 1:
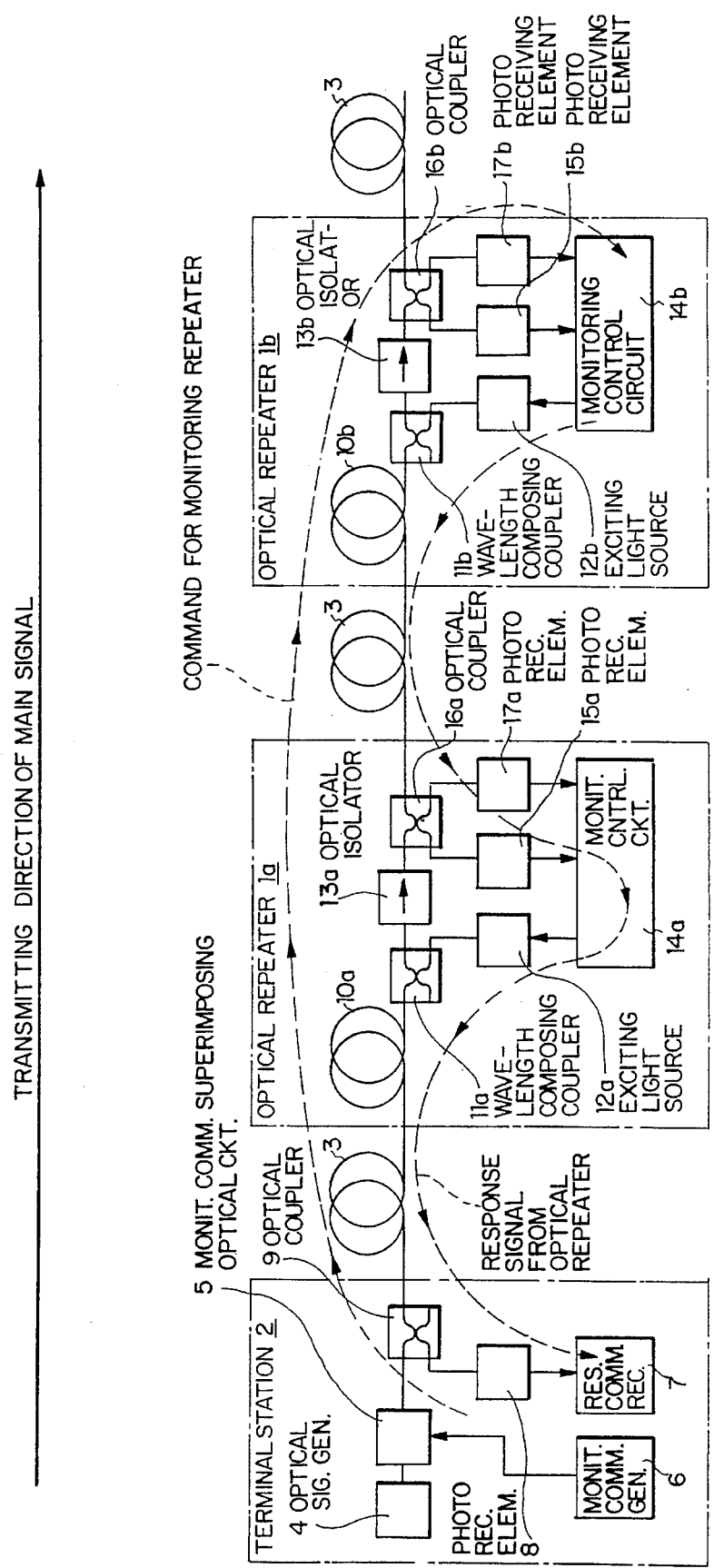
FIG. 1 is a block diagram showing an optical transit system including an optical repeater according to the present invention.
Figure 2:
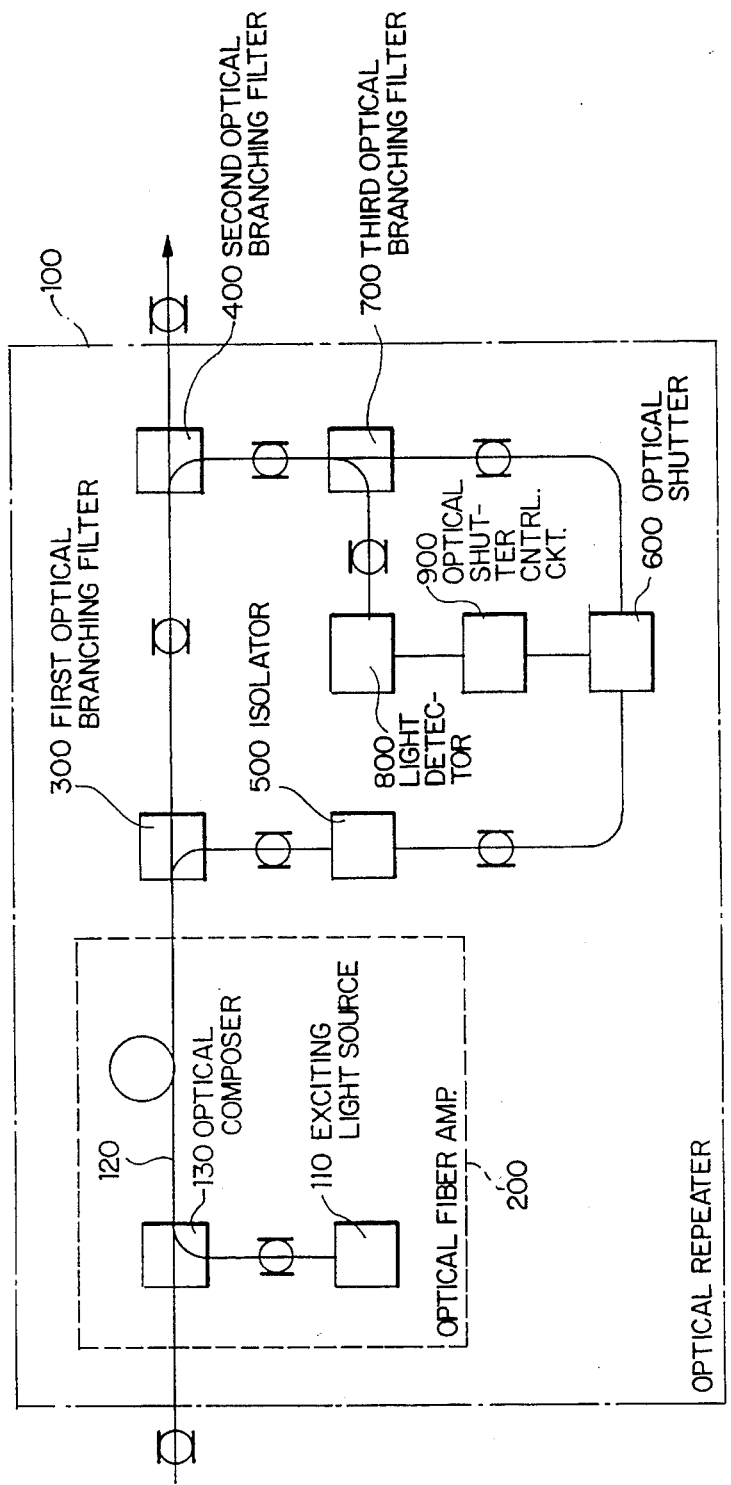
FIG. 2 is a block diagram of a conventional optical repeater employing a bidirectional optical fiber amplifier.

FIG. 1 shows a transmission system repeating an optical primary signal from a terminal station 2 through optical repeaters 1a and 1b in order, with amplification at the respective repeaters.

In the terminal station 2, a monitoring command superimposing optical circuit 5 superimposes an optical signal output by an optical signal generator 4 with a monitoring signal generated by a monitoring command generator 6. An example of the monitoring command superimposing optical circuit 5 is a modulator for providing AM modulation for an optical signal. Examples of the modulator include an LN modulator (LiNbO$_3$ External Modulator) and an EA modulator (Electroabsorption External Modulator). On the other hand, by means of an optical coupler 9 for receiving a response signal transmitted from a downstream repeater, a return light is branched. Then the branched light is received by a photo receiving element 8, and then a response command receiver 7 which reproduces the response signal.

Since the optical repeaters 1a and 1b have identical constructions, discussion will be concentrated on the optical repeater 1b. Basically, the optical repeater 1b includes an optical fiber amplifier which comprises an erbium doped fiber 10b serving as an optical amplifier fiber, an exciting light source 12b for exciting the erbium doped fiber, a wavelength composing coupler 11b for introducing the exciting light generated by the exciting light source from a signal output end of the erbium doped fiber 10b, and an optical isolator 13b for suppressing oscillation of the erbium doped fiber.

The optical signal is amplified by the excited erbium doped fiber 10b and output to the optical isolator 13b. The optical isolator 13b is inserted so as not to return a reflected light into the erbium doped fiber through its signal output end. The amplified signal light is branched by an optical coupler 16b and introduced into a photo receiving element 17b.

A monitoring control circuit 14b extracts a monitoring command from the optical signal received by the photo receiving element 17b and generates a predetermined repeater response signal from effecting amplitude modulation for a current in the exciting light source 12b. The exciting light is modulated by the response signal to excite the erbium doped fiber to feed a residual light to upstream side repeater 1a.

The upstream side optical repeater 1a branches the response signal fed from the downstream side optical repeater 1b by means of the optical coupler 16a and sends the branched signal to the photo receiving element 15a. The monitoring control circuit 14a reproduces the response signal received by the photo receiving element. Then, amplitude modulation is again effected for the current in the exciting light source 12a. Then, the exciting light is modulated by the response signal to excite the erbium doped fiber 10a to feed a residual light to the further upstream side repeater. In the case shown above, the residual light is fed back to the terminal station 2 which initially transmitted the optical signal.

As set forth above, the response signal is repeated by the optical repeaters sequentially and is eventually fed back to the terminal station 2 where it is reproduced by the response signal receiver 7.

It should be noted that the monitoring command issued by the terminal station 2 contains a repeater ID (identification) identifying the optical repeater to be monitored. Each monitoring control circuit operates so that the response signal can be fed back from the optical repeater having an identification (ID) matching with the repeater ID.

On the other hand, as the optical amplifier 10a and 10b, an optical fiber is a rare earth element or its ion. The length of the optical amplifier fiber 10a and 10b should be short enough so that the exciting light can be discharged from the input end of the fiber as the residual light. This prevents the exciting light from being absorbed into the fiber.

As set forth above, by modulating the exciting light for the optical amplifier, repeating the response signal by the residual excited light in one direction opposite to the transmission direction of the optical signal, the response signal can be looped back to the terminal station on the same line without affecting for the characteristics of the optical amplifier.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. An optical repeater for amplifying and repeating an optical signal transmitted from an optical signal source via an optical fiber, said optical signal being superimposed with monitoring information including repeater identification data, said repeater comprising:

an input terminal connected to said optical fiber and for inputting said optical signal transmitted from an upstream side of said optical repeater via said optical fiber;

an optical fiber amplifier means for amplifying the inputted optical signal by optical excitation;

an output terminal;

a unidirectional element for completely transferring the output of said optical fiber amplifier means to said output terminal; and a monitoring processing circuit for processing the monitoring information having:

extracting means for extracting said monitoring information superimposed on the optical signal being output by said unidirectional element, response signal generating means for generating a response signal when the repeater identification data in the extracted monitoring information matches with the repeater identification data of the optical repeater;

response signal reproducing means for reproducing a response signal transmitted from an optical repeater located at downstream side via said optical fiber; and modulating means for modulating the exciting light of said optical fiber amplifier with said response signal;

wherein a residual light of said exciting light is transmitted in a direction opposite to said optical signal from said input terminal connected to said optical fiber via said optical fiber amplifier means.

2. An optical repeater as set forth in claim 1, wherein said optical fiber amplifier means comprises an optical fiber implanted rare earth element or ion thereof, an exciting light source for generating said exciting light, and an excited light composing coupler for supplying the exciting light to a light outputting end of said optical fiber.

3. An optical repeater as set forth in claim 2, wherein said optical fiber is an erbium doped fiber.

4. An optical repeater as set forth in claim 2, wherein said unidirectional element is an optical isolator.

5. An optical repeater as set forth in claim 2, wherein said unidirectional element is connected to an optical signal output end of said exciting light composing coupler.

6. An optical repeater as set forth in claim 5, wherein said optical fiber has a length short enough for discharging the exciting light generated by said exciting light source as the residual light.

* * * * *